United States Patent [19]

Waldman

[11] 4,278,323
[45] Jul. 14, 1981

[54] OPTICAL FIBER SLIP RING

[75] Inventor: Steven B. Waldman, Morganville, N.J.

[73] Assignee: The United States of America as represented by the Secretary of the Army, Washington, D.C.

[21] Appl. No.: 11,279

[22] Filed: Feb. 12, 1979

[51] Int. Cl.³ .............................................. G02B 5/14
[52] U.S. Cl. .................................. 350/96.20; 250/227
[58] Field of Search ...................... 250/227; 350/96.20

[56] References Cited

U.S. PATENT DOCUMENTS

| 3,731,107 | 5/1973 | Goodwin et al. | 350/96.20 |
| 3,742,486 | 6/1973 | Skidmore | 350/96.20 |
| 4,088,387 | 5/1978 | Lewis | 350/96.20 |
| 4,107,517 | 8/1978 | Cooper | 350/96.20 |
| 4,190,318 | 2/1980 | Upton, Jr. | 350/96.20 |

Primary Examiner—Stewart J. Levy
Attorney, Agent, or Firm—Nathan Edelberg; Jeremiah G. Murray; Edward Goldberg

[57] ABSTRACT

A system for the coupling of signals from a movable member, such as a tank cupola, to a fixed member, such as a tank hull, includes a rotatable drum carrying an optic fiber slip ring (an optical wave guide which may be a rigid fiber optic bundle or a rigid plastic resin optic ring). Electronic-photo transducers, such as photodiodes or light emitting diodes, are embedded in the optic fiber slip ring and their light pulses are transmitted across a gap to an optic fiber block also containing electronic-photo transducers.

11 Claims, 3 Drawing Figures

OPTICAL FIBER SLIP RING

The invention described herein may be manufactured and used by or for the Government for governmental purposes without the payment of any royalties thereon or therefor.

BACKGROUND OF THE INVENTION

The present invention relates to the fields of electromagnetics and optics and more particularly to a system in which signals in the form of light pulses are communicated across a gap from a movable member to a fixed member.

At the present time there are a number of methods in which signals may be communicated between a movable member and a fixed member. For example, the movable member may be the cupola (turret) of a military tank and the fixed member may be the hull (body) of the tank. The signals to be communicated may include digital or analog electrical signals representing, for example, information relating to the firing of guns.

One method of communicating in those types of situations is to run wires or cables from the movable member to the fixed member. Cables are generally satisfactory if one member moves only a few degrees in relationship to the other. However, in the case of a tank the cupola may rotate many degrees in either direction and may do so with sharp starts and stops. The movement of wires and cables in that type of environment may prove a problem in terms of other operations.

Alternatively, it is known that a brush-type of system may be used for such communication. In the brush type of system, similarly to a brush in an electrical motor, a brush (which may be a filament or solid metal conductor) rubs against a movable armature, for example, a conductive band. The brush type of system has problems in relationship to static noise, problems arising from wear between the brush and the armature, and problems due to dirt and other adverse environmental effects.

SUMMARY OF THE INVENTION

In accordance with the present invention a system is provided for the coupling of electrical signals between a moving member and a fixed member. In one specific embodiment the rotating member is a rotating drum which is rotatable with the cupola (turret) of a military tank and the fixed member is a casing which is fixed relative to the hull of the tank.

The system includes a spindle connected to the movable member, for example, the tank cupola, and a rotating drum mounted on the spindle. The rotating drum has one or more optical slip rings, which are optical wave guides in the form of optic fiber rings formed with periodic perturbations, i.e., protrusions forming a toothlike ring structure. The rings may be formed from a light transmitting plastic resin, such as methyl acrylic "Plexiglass" (TM of Rohm & Haas) or a fiber optic bundle, both being referred to herein as "optic fiber". The drum rotates in a casing with the number of chambers in the casing corresponding to the number of optic fiber rings on the drum. A series of optic fiber blocks fixed to the casing is arranged around each of the optic fiber rings. Receiving or transmitting solid-state electronic transducer elements (electronic-photo transducers), for example, light emitting diodes (LED) and photodiodes are embedded in the optic fiber ring and electrically connected to the signaling device. Similarly, solid-state electronic receiving and transmitting devices such as photodiodes are positioned within the optic fiber blocks.

Alternatively, fiber optic light transmitters may be connected to the optic fiber ring or block, or both, in place of the embedded solid-state transducer elements and the solid-state elements thereby located outside the casing.

OBJECTIVES AND FEATURES OF THE INVENTION

It is an objective of the present invention to provide an optical coupling system between a movable member and a fixed member to couple electrical and electronic signals and thereby avoid the problems associated with a mechanical signal coupling system.

It is a still further objective of the present invention to provide such an optical coupling system and thereby avoid the mechanical communication failures occasioned by a brush type of system due to wear or other causes and also avoid noise due to the movement of an armature relative to the brush.

It is a still further objective of the present invention to provide such an optical system and thereby avoid the use of wires or cables as a means to communicate electrical or electronic signals, so that there would be no danger of failure or communication due to breakage of such wires or cables.

It is a further objective of the present invention to provide such an optical system which eliminates electronic radiation of signals in the coupling system, which radiation may occur due to the use of a brush-type system.

It is a feature of the present invention to provide a system for the communication of signals from a moving member, for example, a military tank cupola (turret) to a relatively fixed member, for example, the tank hull. The system includes a rotatable means, such as a spindle, connected to the moving member and movable therewith. A drum means is fixed to the rotatable means and an optic fiber ring means (in the form of a fiber optic bundle or plastic resin member) is fixed to the drum and communicates signals in the form of light signals.

The system also includes a light-tight casing fixed to the fixed member and enclosing said optic fiber ring means and an optic fiber block means secured to the casing and positioned proximate to the optic fiber ring. A gap is formed between the optic fiber block means and the optic fiber ring means. A first solid-state electronic-photo transducer means, for example, a photodiode or light emitting diode (LED), is connected to the optic fiber block means and a second solid-state electronic-photo transducer means is connected to the optic fiber ring means. The pair of transducer means communicates across the gap by light signals from and to the faces of the ring means and block means.

BRIEF DESCRIPTION OF THE DRAWINGS

Other objectives and features of the present invention will be apparent from the detailed description which follows and which provides the inventor's best mode of practicing the invention. The detailed description should be taken in conjunction with the accompanying drawings, in which.

DETAILED DESCRIPTION OF THE INVENTION

Figure 1:
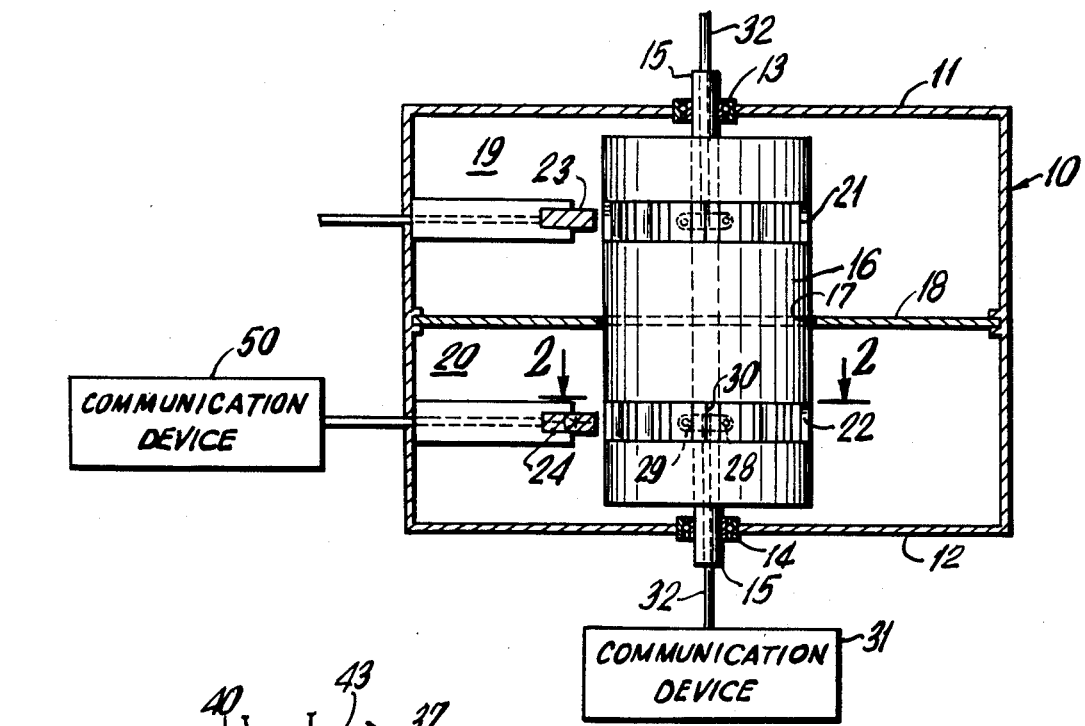
FIG. 1 is a side cross-sectional view of the coupling system of the present invention.

As shown in FIG. 1, the present invention utilizes a light-proof casing 10, for example, of metal, which is secured to the fixed member, for example, the hull of a military tank. The casing 10, at the center of its top wall 11 and at its bottom wall 12, has respective bearings 13 and 14 which rotatably support a hollow tubular spindle 15. The bearings 13 and 14 are provided with light shields so that no external light enters within the chambers of the casing 10.

A drum 16 is fixedly mounted on the spindle 15 so that the drum 16 rotates with the spindle. The drum 16 protrudes through a hole 17 in a non-reflective opaque fixed shield 18. The shield 18 is supported by the casing 10 and separates the casing into an upper chamber 19 and a lower chamber 20. The upper portion of the drum 16 carries an optical wave guide 21 and the lower portion of the drum 16 carries a separate optical wave guide 22, the wave guides 21 and 22 being further described in connection with FIG. 2. A first set of optic fiber blocks 23 is fixed relative to the casing 10 and within upper chamber 19. Similarly, a second set of optic fiber blocks 24 is fixed relative to the casing 10 within the lower chamber 20.

Figure 2:
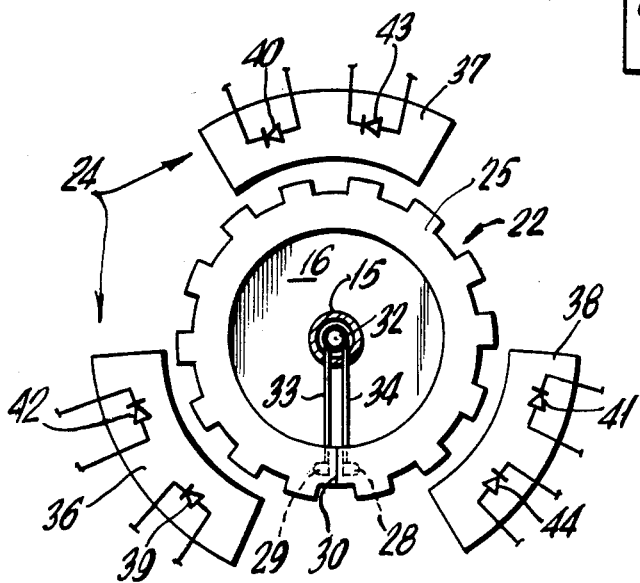
FIG. 2 is a cross-sectional view taken along lines 2—2 of FIG. 1 and looking in the direction of the arrows.

As shown in FIG. 2, the lower wave guide 22 consists of an optic fiber ring 25 having evenly spaced exterior perturbations. The perturbations are tooth-like protrusions protruding perpendicularly to the axis of the spindle 15. As shown in FIG. 2 a first solid-state receiving (or transmitting) transducer element 28 is implanted in the ring 25 and a second oppositely directed and similar transducer element 29 is implanted in an adjacent portion of the ring 25. The transducer elements 28,29 are positioned on the opposite side of a joint 30 in the ring, which joint 30, for example, may be formed by an epoxy adhesive.

It will be understood that the solid-state electronic transducer elements (herein called "electronic-photo transducers") 28 and 29 may be either receiving or transmitting elements or may include both receiving and transmitting elements. A suitable solid-state transmitting element is a solid-state light emitting diode (LED) which converts an electrical signal into a light pulse in the suitable wave length and in suitable contact with the fiber optic bundle, so that the light pulse appears at the exit face of the bundle. Sometimes LED's are called "luminescent diodes." A suitable solid-state receiving transducer element is a photodetector diode or a photodetector transistor.

Each segment (each protrusion in the case of the fiber optic ring) of the front face of the optic fiber ring and optic fiber block is flat in the direction parallel to the axis of the drum.

The terms "optic fiber ring" or "optic fiber block," as used herein, refer to light wave guides which may be a molded light transmitting plastic resin (first embodiment) or a fused bundle of optic fibers (second embodiment). A suitable light transmitting plastic resin is a clad molded or cast member of "Plexiglass" (TM of Rohm & Haas) or other suitable plastic resin. The FIGS. 1 and 2 apply to both embodiments and FIG. 3 applies to the second embodiment.

In the second embodiment of the present invention the fiber optic ring and block each comprises a large number of individual clad glass optic fibers forming a fused bundle. However, the bundle may be relatively low in cost as it does not need to be coherent, i.e., the individual clad glass optic fibers are not laid in an exact predetermined pattern. Coherent fiber optic bundles are generally used to convey an image and the non-coherent fiber optic bundles may be used to communicate a light pulse.

The term "fiber optics" describes a light conduit which is manufactured of thin cylindrical glass fibers of high optical quality. A single fiber, resembling a strand of a spider web, may be from 2–100 microns in diameter, but generally is in the range of 4–6 microns in diameter. Light entering one end of the glass fiber is transmitted to the other end by total internal reflection, with the transmission of a 10-inch length being between 60%–90%. The percentage of transmission is somewhat affected by wave length but is substantially flat in the wave length band from 0.400 micron to 1.4 micron.

A large number of fibers are gathered together to form the non-coherent and non-flexible bundle. The fibers of the bundle are bonded together and an optical clear plastic used to pot or glaze the fiber bundle. Each of the glass fibers is clad, i.e., insulated, with a glass coating having a lower refractive index than the refractive index of the fiber itself. The coating, called "cladding," prevents light leaking from one fiber to another and results in every fiber having a core completely enclosed in its own clad. For example, the core may have a refractive index of about 1.62 and the cladding a refractive index of about 1.52. Each fiber transmits a tiny segment of the original light pulse so that the light pulse at the exit face of the bundle, i.e., the outer face of the ring, is transmitted almost instantaneously, i.e., at the speed of light.

The electronic communication device (signaling device) 31 is fixed to the spindle 15; for example, it is fixed relative to the tank cupola. A second communication device 50 is fixed on the fixed member and has a cable connection to the transducers of the fiber optic blocks. Each communication device 31,50 may include analog-digital converters, modulation circuits, amplifiers, and diode devices. The communicating device 31 transmits (or receives, or both) signals on cable 32 to the transducers 29,28 and the other transducers carried by the optic fiber rings 21,22. Preferably each transducer is so connected by a separate wire lead 33,34 (see FIG. 2) of the cable and the cable is within the tubular hollow spindle.

As shown in FIG. 2 the set of blocks 24 consists of three optic fiber blocks 36,37,38 each of which has embedded therein two electronic-photo transducers. For example, the blocks 36,37,38 have respective transmitting photodiodes (LED) 39,40,41 and also respective photodetector diodes 42,43,44. The receiving photodiodes are redundant, i.e., they all receive the same light pulse at the same time, as a noise reduction measure.

Alternatively, and not shown, the cable 32 may be replaced by fiber optic light pipes and the transducers located outside the case 10, for example, in the communication device 31.

Figure 3:
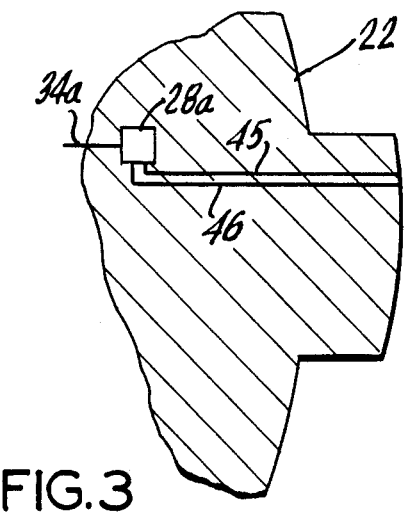
FIG. 3 is an enlarged cross-sectional schematic view of the fiber optic ring of the present invention showing the arrangement of a few representative fiber optic strands.

As shown in FIG. 3, the individual fiber optic strands 45,46 (representing many hundreds of such strands) have their inner end in optical contact with the emitting (or receiving) face of the electro-photo transducer element 28a (for example, an LED). Their opposite (outer end) terminates in the outer wall of the ring 22.

The embodiment shown in FIG. 2 shows a two-chamber casing. However, the casing may have many light-tight and light-separated chambers, for example, ten, and the drum would carry one fiber optic ring within each chamber to communicate with a separate set of optic fiber blocks within each chamber.

Various types of signal processing may be utilized in connection with the present invention. For example, the electrical signals may be in the form of pulse code modulation (PCM) so that the corresponding light pulses vary in duration (pulse width) and are constant in intensity (pulse amplitude). Other conventional modulation techniques, such as FM, AM, CVSD, PPM, etc., may alternatively be used, as may various multiplexing techniques.

The present invention has been described in the specific embodiment of the moving member being a tank cupola and the fixed member a tank hull. However, the present invention may be utilized in other settings. For example, the moving member may be an elevator and the fixed member may be control points on the frame; or the moving member may be a vehicle (a train or car) and the fixed member may be control points (embedded in the rail or road) and the signals may be guidance or control signals.

What is claimed is:

1. A system for communication of signals from a moving member to a relatively fixed member, including:
    a hollow rotatable tubular support means connected to said moving member to be movable therewith,
    drum means mounted coaxially on said tubular support means for rotation therewith,
    an optic fiber ring mounted on said drum to communicate light signals, said optic fiber ring including a plurality of periodic alternating projections and spaces formed in the surface of said ring and distributed around the outer circumference, an optic fiber block means secured to said fixed member and positioned around and proximate to said optic fiber ring and forming a gap between said optic fiber block means and said projections on said outer circumference of said optic fiber ring,
    a first solid state electronic-photo transducer means connected to said optic fiber block means and a second solid-state electronic-photo transducer means connected to said optic fiber ring,
    first means for communicating signals through said hollow tubular support means to said fiber optic ring transducer means, and second means for communicating signals to said fiber optic block transducer means, said first and second transducer means being adapted to communicate across said gap by light signals.

2. A system for the transmission of signals as in claim 1 wherein said optic fiber block comprises a series of spaced circumferential individual optic fiber blocks each presenting a concave face to said optic fiber ring matching the curvature of said optic fiber ring.

3. A system for the transmission of signals as in claim 1 wherein said moving member is a military tank cupola and said fixed member is the hull of said tank.

4. A system for the transmission of signals as in claim 1 wherein said hollow rotatable tubular support means is a spindle, said fixed member including a light-tight casing secured thereto and enclosing said fiber optic ring and block means, said spindle being rotatably mounted on said casing.

5. A system for the transmission of signals as in claim 4 wherein said casing has a plurality of separated light-tight chambers and wherein each chamber encloses a separate fiber optic ring.

6. A system for the transmission of signals as in claim 4 wherein said second electronic-photo transducer includes a light emitting diode connected by cable through said drum and hollow tubular support to a transmitter within said moving member.

7. A system for the transmission of signals as in claim 6 wherein said first electronic-photo transducer includes a photodiode connected by cable through said casing to a receiver transmitter within said fixed member.

8. A system for the transmission of signals as in claim 1 wherein said second electronic-photo transducer is enclosed within said ring.

9. A system for the transmission of signals as in claim 8 including fiber optic cable means connected between said second transducer means and an outer surface of a projection in said fiber optic ring adjacent said first transducer means of said optic fiber block.

10. A system for the transmission of signals as in claim 1 wherein the light signals are transmitted to said ring means by a fiber optic cable from outside of said casing.

11. A system for the communication of signals from a rotatable member to a relatively fixed member, including:
    (a) a rotatable hollow spindle connected to said rotatable member to be movable therewith;
    (b) drum means mounted coaxially on and fixed to said rotatable spindle for rotation therewith;
    (c) a plurality of optic fiber rings fixed to said drum and having a plurality of periodic alternating projections and spaces formed in the surfaces of said rings and distributed around the outer circumference to communicate light signals;
    (d) a light-tight casing fixed to said fixed member and having a plurality of light-tight chambers, with each chamber enclosing one of said optic fiber rings;
    (e) a plurality of optic fiber block means each secured to said casing with one of said block means in each chamber and positioned proximate to said optic fiber ring and each forming a gap between each of said optic fiber block means and said projections on said outer circumference of each said fiber ring;
    (f) wherein in each of said chambers a first solid state electronic-optical transducer means is connected to its respective optic fiber block means through said casing and a second solid-state electronic-optical transducer means is connected through said hollow spindle to said optic fiber ring; and
    (g) first and second means for communicating signals to respective said transducer means, said transducer means being adapted to communicate across said gap by light signals.

* * * * *

UNITED STATES PATENT AND TRADEMARK OFFICE
CERTIFICATE OF CORRECTION

PATENT NO. : 4,278,323
DATED : July 14, 1981
INVENTOR(S) : STEVEN B. WALDMAN

It is certified that error appears in the above-identified patent and that said Letters Patent are hereby corrected as shown below:

On the title page:

Item [73] should be deleted.

Signed and Sealed this

First Day of December 1981

[SEAL]

Attest:

GERALD J. MOSSINGHOFF

Attesting Officer

Commissioner of Patents and Trademarks